United States Patent [19]
Engel

[11] Patent Number: 5,109,579
[45] Date of Patent: May 5, 1992

[54] FISHING ROD CLAMPING DEVICE

[76] Inventor: Laurence G. Engel, 329 Greenwich St., New York, N.Y. 10013

[21] Appl. No.: 722,513

[22] Filed: Jun. 27, 1991

[51] Int. Cl.⁵ .................... A44B 21/00; A01K 87/00
[52] U.S. Cl. ........................................ 24/339; 24/336; 43/21.2; 43/25.2
[58] Field of Search ............ 24/339, 336, 338, 129 R, 24/129 D; 43/44.85, 21.2, 25, 25.2, 15, 26.1

[56] References Cited

U.S. PATENT DOCUMENTS

| | | | |
|---|---|---|---|
| 947,111 | 1/1910 | Lorentz | 24/129 R |
| 2,993,293 | 7/1961 | Blout | 43/25.2 |
| 3,050,803 | 8/1962 | Hulterstrum | 24/129 R |
| 3,113,363 | 12/1963 | Fyvie. | |
| 3,425,150 | 2/1969 | Braese. | |
| 3,832,796 | 9/1974 | Cardwell et al. | |
| 3,992,799 | 11/1976 | Oakes. | |
| 4,265,046 | 5/1981 | Keith. | |
| 4,707,892 | 11/1987 | Nelson. | |

Primary Examiner—Victor N. Sakran
Attorney, Agent, or Firm—Charles E. Baxley

[57] ABSTRACT

A fishing rod clamping device for holding a two-section fishing rod with the sections disassembled, ready for reassembly with each other, is a one-piece modified tube of resilient material having first, second, third and fourth portions joined by first, second and third webs and having opposite ends. The first, second and third portions are cylindrical and the tube further has a slit that runs lengthwise of the first, second and third portions and is interrupted by the webs. The slit enables releasable engagement of one cylindrical portion with another cylindrical portion or with a rod section. The fourth section is disclosed as an additional cylindrical portion that is engageable with the second cylindrical portion and may be cemented thereto. If cemented to the second cylindrical portion, the fourth portion need not be cylindrical. The opposite ends of the tube are provided by end bevels.

11 Claims, 10 Drawing Sheets

FISHING ROD CLAMPING DEVICE

BACKGROUND OF THE INVENTION

This invention relates to a fishing rod clamping device, and more particularly to such a clamping device for holding a two-section fishing rod with the sections disassembled, ready for almost instantaneous reconnection, in condition to cast again.

The inventive clamping device readily lends itself for use in the field in disassembling the fishing rod for storage or transporting purpose and in assembling the rod for use. When the rod is in the assembled condition the clamping device is not needed.

When the rod is in the disassembled condition, it is held so by the inventive clamping device, with the reel, line, leader and fly intact as a unit, always at the ready for reconnection and reuse.

When the rod is in the disassembled condition at half its length, the tip is out of harm's way, the fly is on and the line taut and secure from fouling, and the rod may be carried, stored or transported easily, quickly and safely, and yet it will remain constantly at the ready.

The inventive clamping device enables the fisherman to protect his or her rod from low bridges that are encountered, with no loss of stealth.

The inventive clamping device is of one-piece construction, is advantageously formed of plastic material, suitable examples of which are vinyl or polyethylene and is quite economical and is very durable.

Furthermore, the inventive clamping device is quite simple to use, albeit requiring a modicum of finesse on the part of the user, and is adaptable to the personal style of the particular fisherperson.

Additionally, the inventive clamping device will not scratch or mar the rod finish.

In short, the invention makes fishing more enjoyable for little if any net cost.

Important objects of the invention are to provide a fishing rod clamping device having the foregoing advantages.

The manner in which the invention achieves the foregoing objects and advantages will appear hereinafter.

A patentability search on the subject matter hereof has revealed the following prior U.S. patents:

| U.S. Pat. No. | Date | Inventor(s) |
| --- | --- | --- |
| 3,113,363 | December 10, 1963 | Fyvie |
| 3,425,150 | February 4, 1969 | Braese |
| 3,832,796 | September 3, 1974 | Cardwell et al. |
| 3,992,799 | November 23, 1976 | Oakes |
| 4,265,046 | May 5, 1981 | Keith |
| 4,707,892 | November 24, 1987 | Nelson |

Fyvie discloses apparatus for clamping in side-by-side relation a plurality of rod sections, the apparatus comprising a clamping member of yieldable material having as many openings therein as there are rod sections, each opening with a slot communicating with the outer wall of the member to form a constricted throat through which a rod section may pass to be received in the opening. Examples of suitable material are polyethylene or rubber.

Braese teaches a pair of fishing pole clips of rubber or other resilient material. The clips are of different sizes and each has a pair of spaced parallel sleeve portions.

Cardwell et al. is a fishing rod holder comprising a block of resilient material, a pair of rigid arms connected to opposite sides of the block in spaced relation and having free ends extending away from the block to provide clamping jaws. The arms are channel-shaped with side flanges which embrace the block, and a pin which secures the arms to the block. The clamping jaws are normally closely spaced and are adapted to be yieldably spread apart for access by an item being held.

Oakes discloses a support member with a pair of sockets.

Keith teaches a rod holder device comprising a receiver body movably attached to a fishing rod as by a pivot pin. The receiver body is movable between a closed condition and an open condition. A receiver aperture is formed in the receiver body and is sized and shaped to receive the male end of a rod section therein.

Nelson discloses a clamping device for securing the elements of fishing pole, once the extensions have been taken apart.

The aforesaid prior patents are not believed to have any limiting effect on the present invention.

SUMMARY OF THE INVENTION

A fishing rod clamping device embodying the present invention is a one-piece modified tube of resilient material, such as vinyl or polyethylene or rubber having an outside diameter of about 0.325 inch (0.83 cm), a wall thickness of about 0.05 inch (0.13 cm), and an inside diameter of about 0.225 inch (0.57 cm). The length of the modified tube may be about 15.25 inches (38.1 cm). At one end of the modified tube, there is a first end bevel extending about 0.5 inch (1.3 cm) lengthwise of the tube, adjacent to which is a first cylindrical portion extending about 3.75 inches (9.53 cm) lengthwise of the tube. A second cylindrical portion is about 3 inches (7.6 cm) long and is joined to the first cylindrical portion by a first web about 1.75 inches (4.45 cm) long. A third cylindrical portion about 1.75 inches (4.45 cm) long is joined to the second cylindrical portion by a second web about 1.625 inch (4.2 cm) long. A fourth cylindrical portion about 0.75 inch (1.9 cm) long is joined to the third cylindrical portion by a third web about 1.625 inch (4.2 cm) long and to a second end bevel about 0.5 inch (1.3 cm) long. The first, second, third and fourth cylindrical portions are provided with a longitudinal slit which is interrupted at the webs. The cylindrical portions join and merge smoothly with the end bevels and with the webs.

In result, the one-piece modified tube can be looped together with itself into a form which is convenient for carrying or placing in a fishing vest or a tackle box, and which at the same time is also convenient for use in manipulating two adjacent portions of a fishing rod into extended assembled relationship or into disassembled relationship.

DESCRIPTION OF THE INVENTION

Figure 1:
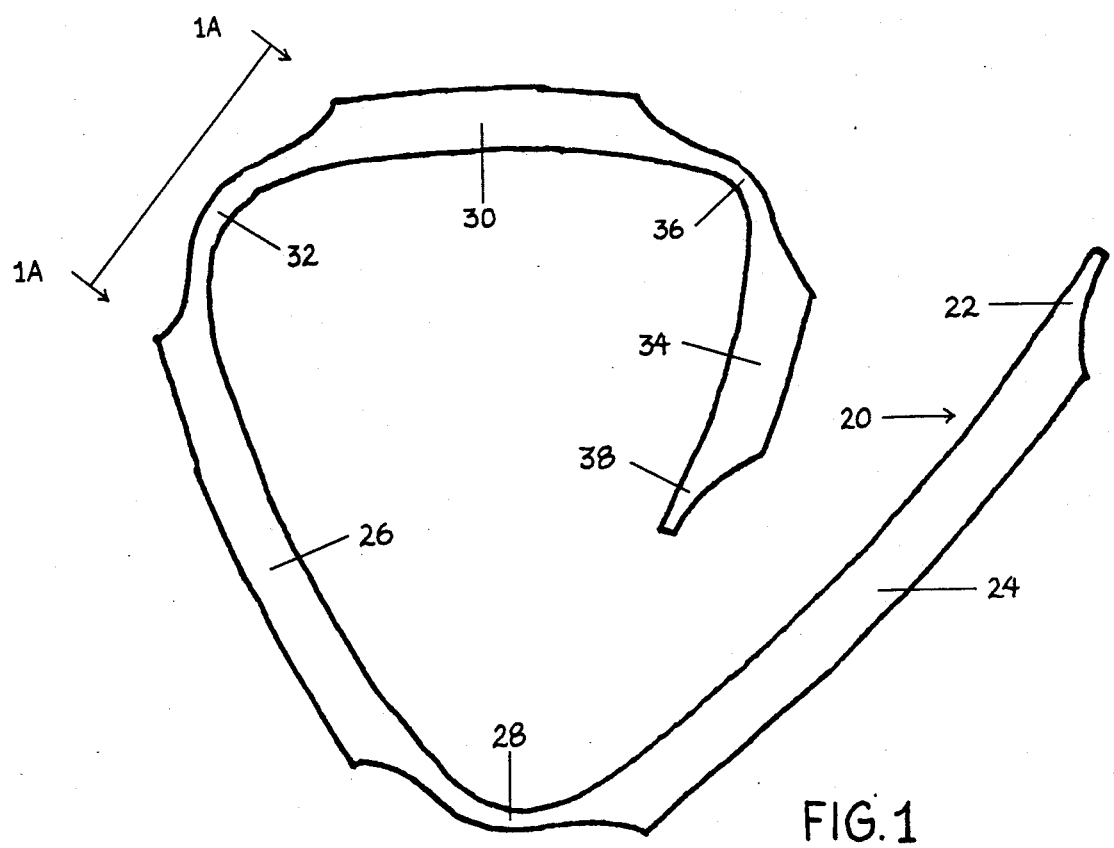
FIG. 1 is a view showing a first preferred embodiment of a fishing rod clamping device according to the invention in disengaged relationship with itself.
Figure 1A:
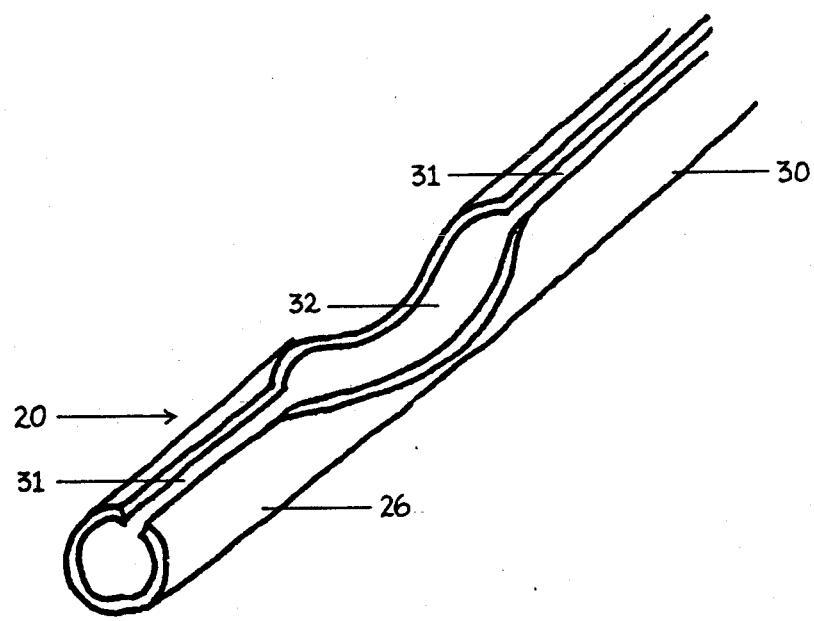
FIG. 1A is an enlarged view substantially on line 1A—1A of FIG. 1.
Figure 2:
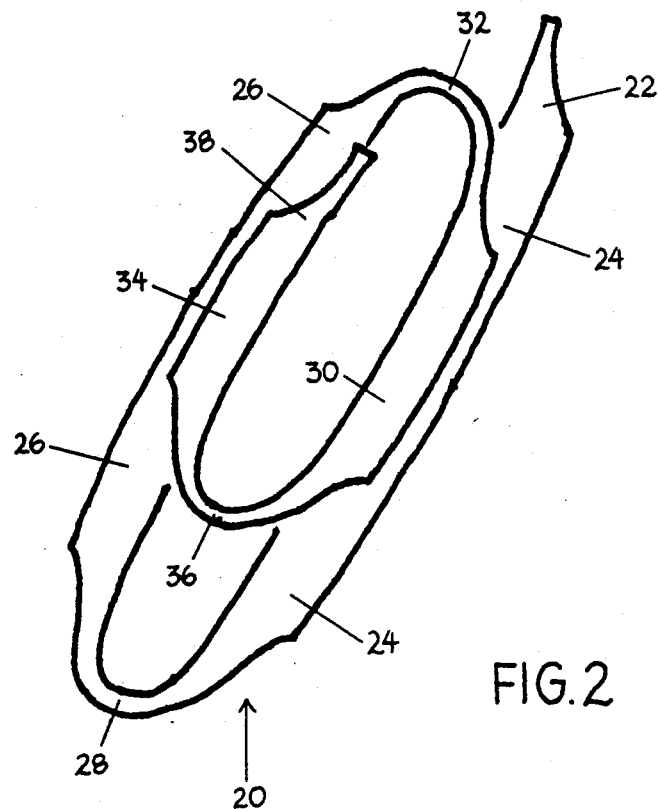
FIG. 2 is a view showing the fishing rod clamping device of FIG. 1 in looped together relationship with itself.

FIGS. 1, 1A and 2 show a fishing rod clamping device 20 that is a first preferred embodiment of the invention. In FIG. 1 device 20 is illustrated in disengaged relationship with itself, whereas in FIG. 2 device 20 is shown looped together with itself.

Device 20 is a one-piece modified tube of resilient material, such as vinyl or polyethylene or rubber with an outside diameter of about 0.325 inch (0.83 cm)., a wall thickness of about 0.05 inch (0.13 cm) and an inside diameter of about 0.225 inch (0.57 cm). The length of the modified tube is about 15.25 inches (38.1 cm). At one end of the tube, there is a first end bevel 22 that extends about 0.5 inch (1.3 cm) lengthwise of the tube, adjacent to which is a first cylindrical portion 24 extending about 3.75 inches (9.53 cm) lengthwise of the tube. A second cylindrical portion 26 is about 3 inches (7.6 cm) long and is joined to first cylindrical portion 24 by a first web 28 about 1.75 inches (4.45 cm) long. A third cylindrical portion 30 about 1.75 inches (4.45 cm) long is joined to second cylindrical portion 26 by a second web 32 about 1.625 inches (4.2 cm) long. A fourth cylindrical portion 34 about 0.75 inch (1.9 cm) long is joined to third cylindrical portion 30 by a third web 36 about 1.625 inch (4.2 cm) long and to a second end bevel 38 about 0.5 inch (1.3 cm) long.

Each of first, second, third and fourth cylindrical portions 24, 26, 30 and 34 is provided with a longitudinal slit 31 throughout its length so that it can be moved in a direction transversely of itself into snap fit engagement with a fishing rod section or another one of cylindrical portions 24, 26, 30 and 34 as indicated in FIG. 2. Slit 31 is best shown in FIG. 1A. It runs lengthwise of cylindrical portions 24, 26, 30 and 34, and extends from end bevel 22 to end bevel 38, but is interrupted at webs 28, 32 and 36. End bevels 22 and 38 but is interrupted at webs 28, 32 and 36. End bevels 22 and 38 and the ends of webs 28, 32 and 36 merge smoothly with the cylindrical portions.

In result, the one-piece modified tube that is clamping device 20 can be placed in looped-together relationship with itself as shown in FIG. 2 with cylindrical portion 34 in surrounding engagement with cylindrical portion 36 and with cylindrical portion 30 in surrounding engagement with cylindrical portion 24. In the FIG. 2 condition, device 20 is convenient for carrying or placing in a fishing vest or a tackle box and at the same time is convenient for use in manipulating two adjacent sections 50 and 52 (seen in FIGS. 3-17) of a fishing rod from extended assembled relationship into disassembled, side-by-side relationship and back again.

Figure 3:
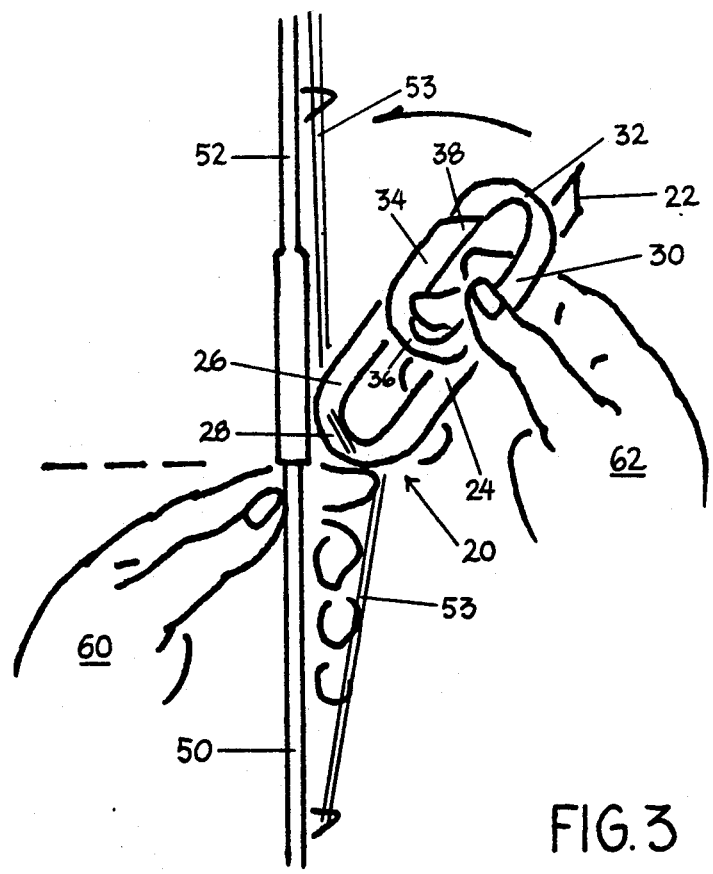
FIGS. 3 through 17 are views showing progressive stages in the use of the preferred embodiment, starting in FIG. 3 with a fishing rod with two sections assembled end to end and progressing to a condition in which the sections are held in side-by-side relation by the clamping device and progressing from that condition back to the original condition.

FIGS. 3-17 depict in order a complete cycle of a preferred manner of use of device 20 with fishing rod sections 50 and 52, it being understood that other manners of use of device 20 with fishing rod sections 50 and 52 may occur to a user. More particularly, FIG. 3 shows sections 50 and 52 assembled with each other in extended end-to-end condition, in normal fashion for use in fishing. FIG. 11 shows sections 50 and 52 in side-by-side condition disassembled from each other and so held by device 20. FIG. 17 shows sections 50 and 52 once again in the extended end-to-end condition. FIGS. 4-10 show the progression in the use of device 20 in going from the condition of FIG. 3 to the condition of FIG. 11, and FIGS. 12 through 16 show the progression in the use of device 20 in going from the condition of FIG. 10 to the condition of FIG. 17, which is the same as the condition depicted in FIG. 3. The cycle has now been completed.

It is believed that what is shown in FIGS. 3-17 is largely self-evident, but those views are nevertheless described in the following paragraphs, it being first noted that each of FIGS. 3-17 shows manipulation of device 20 and/or rod sections 50 and 52 by a user's left hand 60 and right hand 62.

FIG. 3 shows sections 50 and 52 oriented vertically and assembled in extended end-to-end relationship with section 50 below section 52, sections 50 and 52 being releasably so held in conventional frictional fashion.

FIG. 3 also shows device 20 positioned for assembly with upper rod section 52 with slit 31 at the end of second cylindrical portion 26 adjacent web 28 in position first to engulf line and leader 53 and then to be pushed onto upper rod section 52 with second cylindrical portion 26 making an acute angle with upper rod section 52 and an obtuse angle with lower rod section 50.

Figure 4:
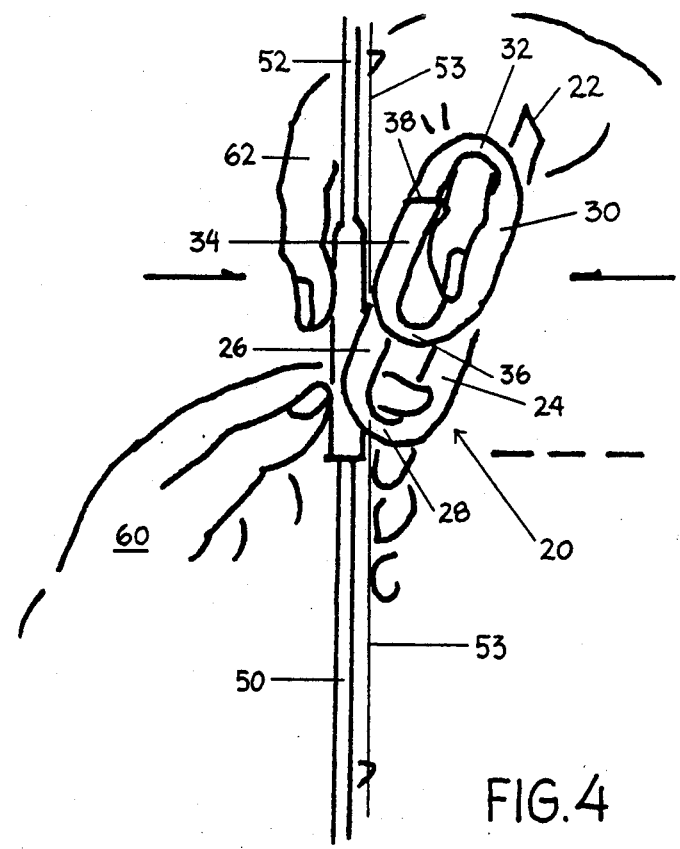

FIG. 4 shows device 20 assembled with upper rod section 52 with slit 31 at the end of second cylindrical portion 26 adjacent web 28 having been passed over upper rod section 52 adjacent its lower end.

Figure 5:
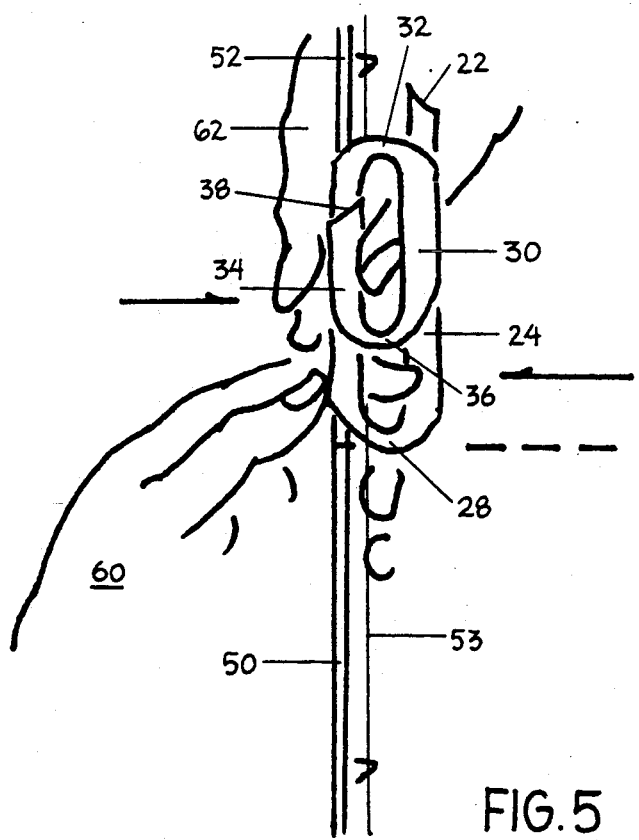

FIG. 5 shows device 20 after it has passed from the FIG. 4 condition to a condition in which slit 31 has passed overpower rod section 52 from end to end of second cylindrical portion 26.

Figure 6:
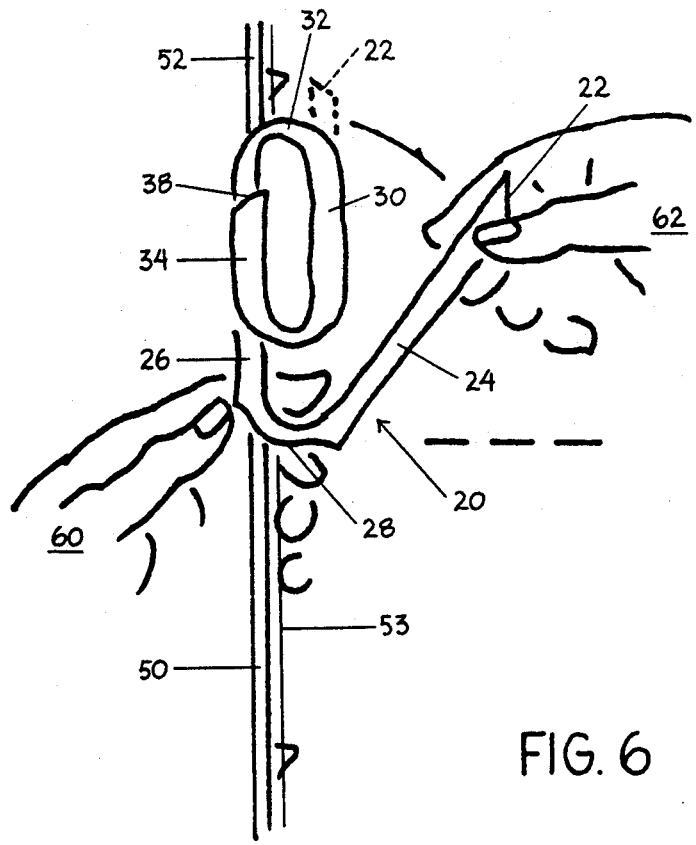
Figure 7:
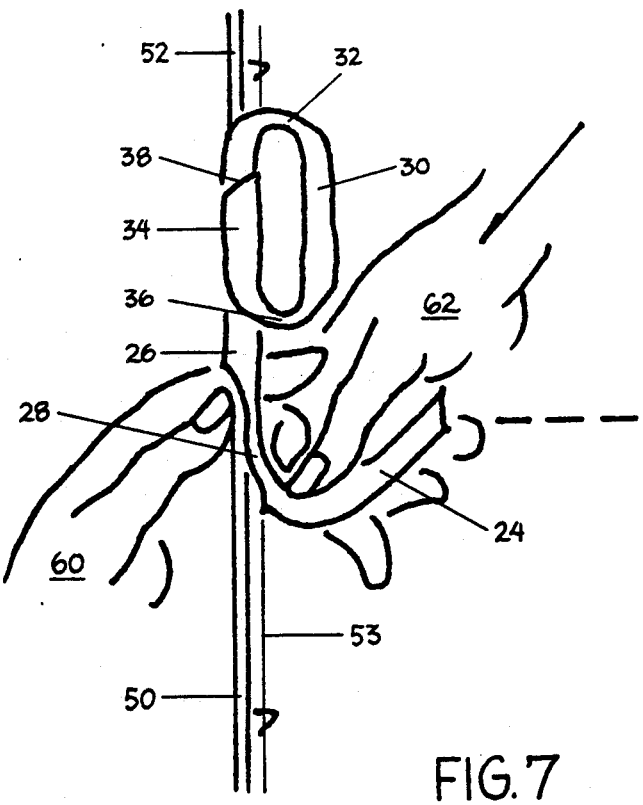
Figure 8:
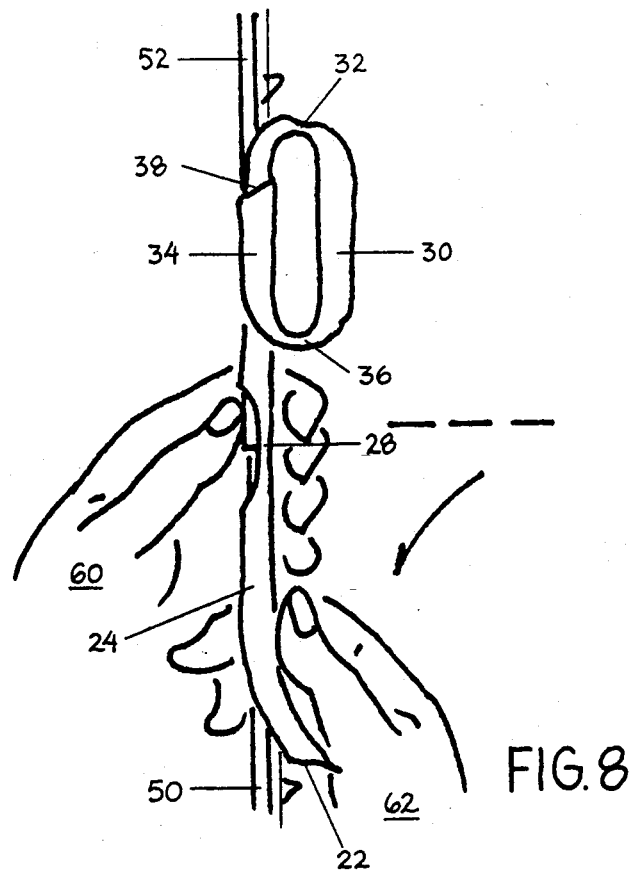
Figure 9:
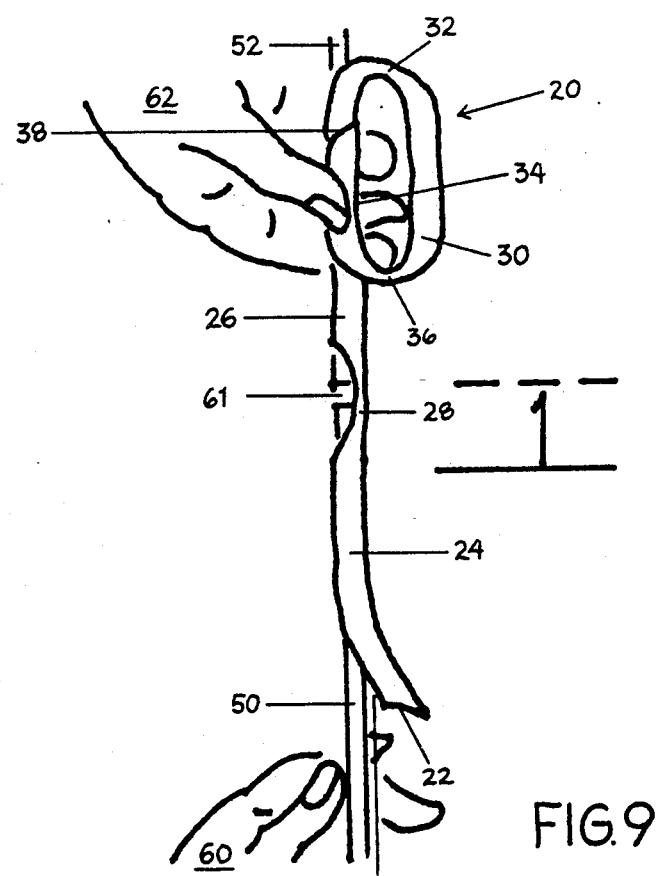

Next, as shown in FIG. 6, first cylindrical portion 24 is pulled away from third cylindrical portion 30 and is pushed downwardly onto lower rod section 50 with slit 31 in first cylindrical portion 24 passing over lower rod section 50, as shown in FIGS. 7, 8 and 9, with web 28 straddling rod sections 50 and 52. At this point, rod sections 50 and 52 are moved axially apart to create a gap therebetween as indicated at 61 in FIG. 9.

Figure 10:
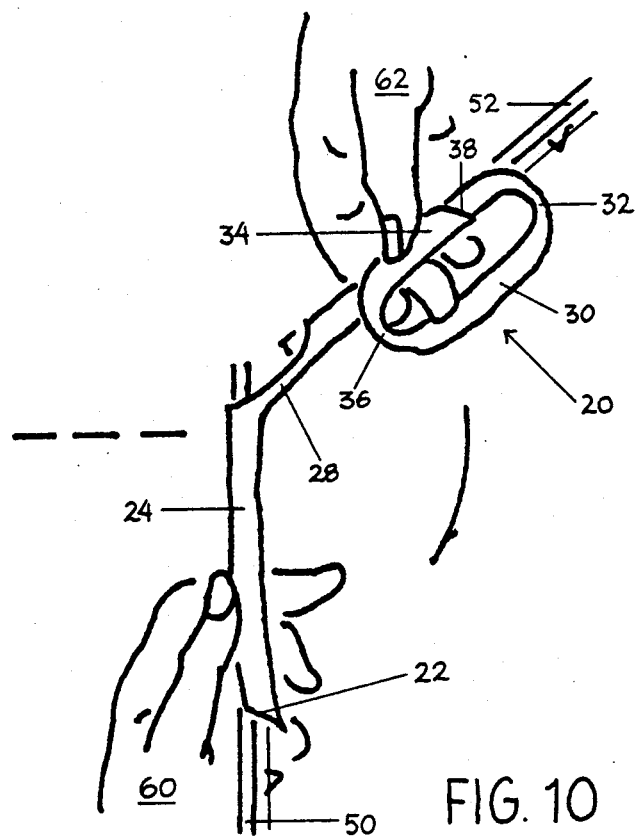
Figure 11:
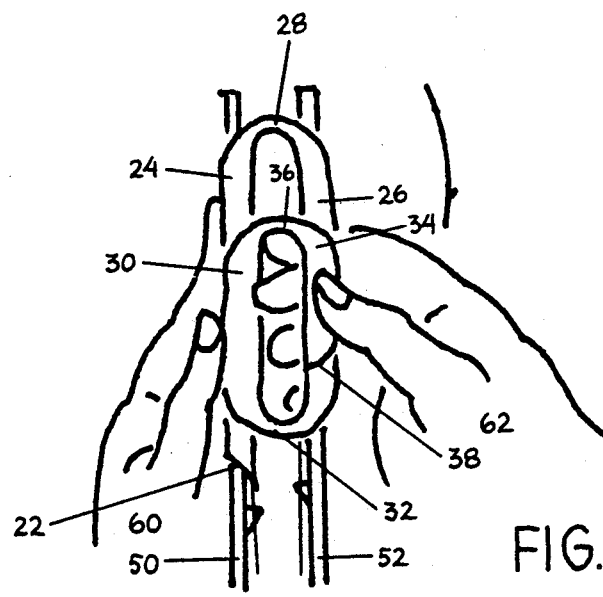

Next, as shown in FIG. 10 and 11, rod sections 50 and 52 are subjected to relative folding until they are parallel to each other with device 20 therebetween. When rod sections 50 and 52 are brought into parallelism, third cylindrical portion 30 opens along slit 31 whereby first cylindrical portion 24 receives third cylindrical portion 30 thereover. Thus, in the FIG. 11 condition, first cylindrical portion 24 contains rod section 50 therein, second cylindrical portion 26 contains rod section 52 therein, third cylindrical portion 30 contains first cylindrical portion 24 and fourth cylindrical portion 34 contains second cylindrical portion 26, all such containments being releasable and having been achieved by virtue of slit 31.

In the FIG. 11 condition, the fishing rod is in its fully-shortened condition with all of the benefits thereof.

Figure 12:
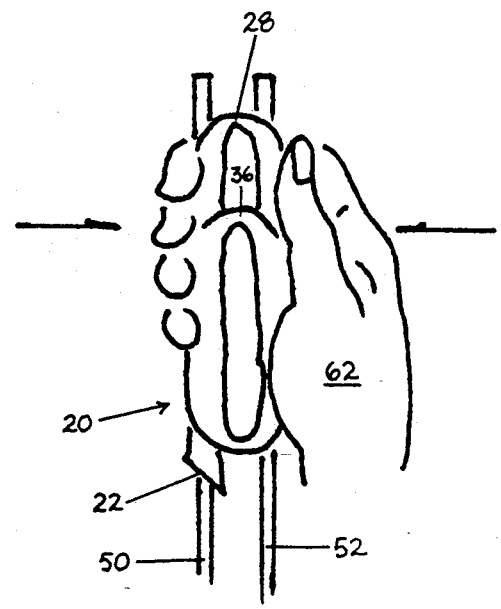

FIG. 12 shows the rod in the same fully-shortened condition as in FIG. 11, but FIG. 12 shows the rod held only by right hand 62, whereas FIG. 11 shows the rod still held by both hands 60 and 62 at the finish or the manipulating operation.

Figure 13:
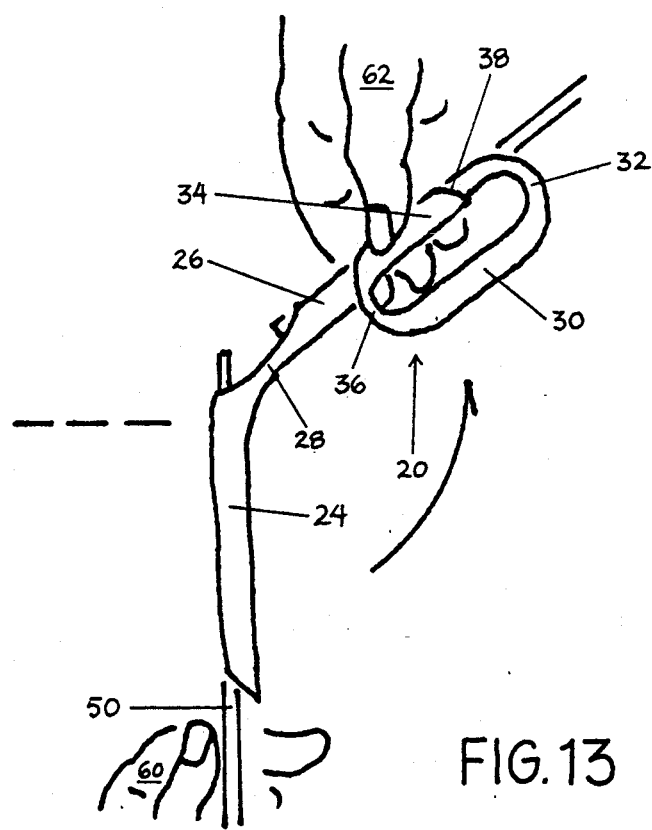

It will now be assumed that it is desired to restore the rod to its extended condition, in which rod sections 50 and 52 are aligned with each other. To do this, rod section 52 is rotated or hinged counterclockwise with respect to rod section 50, as shown in FIG. 13, breaking the engagement of third cylindrical portion 30 with first cylindrical portion 24, as shown in FIG. 13, wherein rod section 52 is shown making an angle of about 135° with rod section 50.

Figure 14:
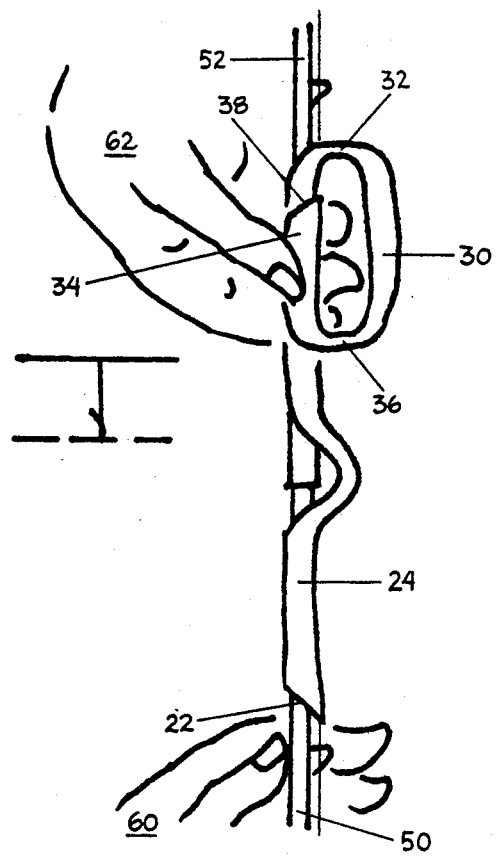

The counterclockwise rotation is continued until rod sections 50 and 52 are aligned and are then moved relatively longitudinally of each other into reengagement as shown in FIG. 14, which also shows that web 28 has bulged transversely outwardly from the joint between rod sections 50 and 52, leaving first cylindrical portion 24 still engaging lower rod section 50.

Figure 15:
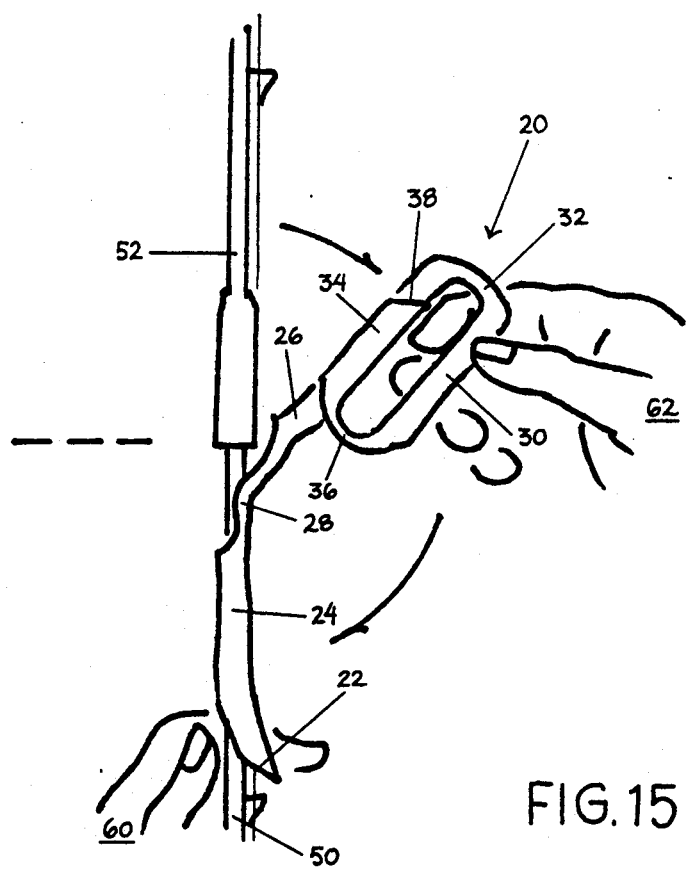

Then, as shown in FIG. 15, third cylindrical portion 30 is pulled in a clockwise direction away from upper rod section 52, disengaging second cylindrical portion 26 from rod section 52 while maintaining engagement of fourth cylindrical portion 34 with second cylindrical portion 26.

Figure 16:
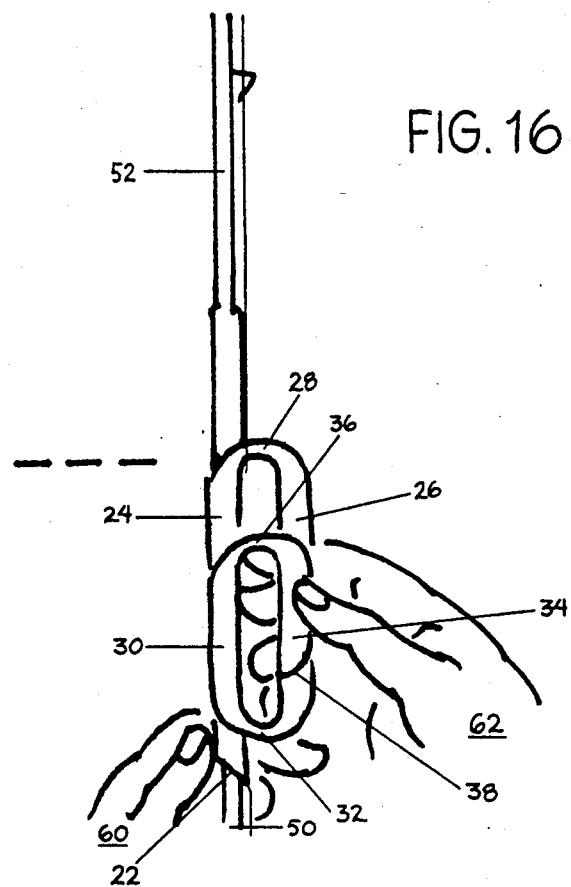
Figure 17:
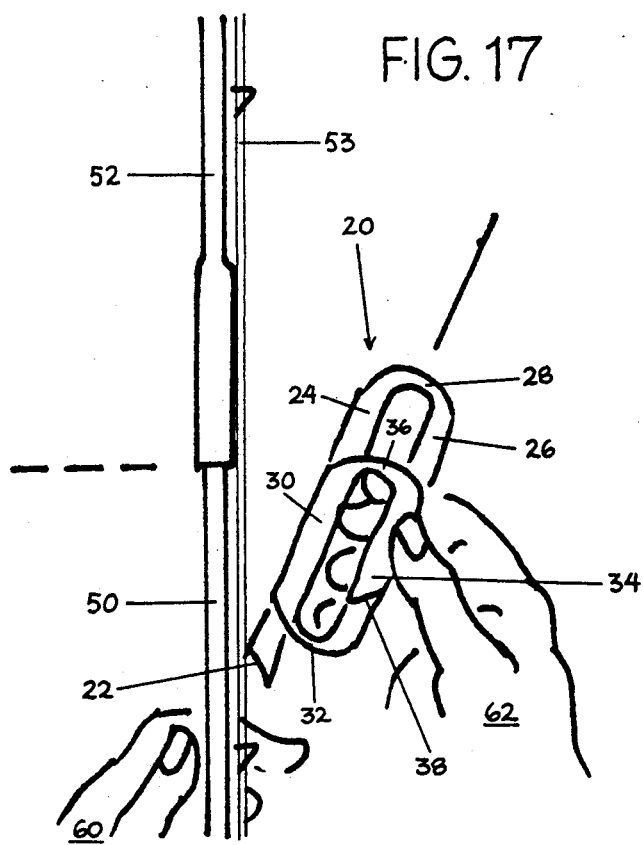

The clockwise movement depicted in FIG. 15 is continued until third cylindrical portion 30 engages first cylindrical portion 24 as shown in FIG. 16, and then device 20 is bodily moved diagonally upwardly away from rod section 50 as shown in FIG. 17, thus completing the operating cycle and returning all parts to their FIG. 3 condition, ready for another shortening-lengthening cycle.

Figure 18:
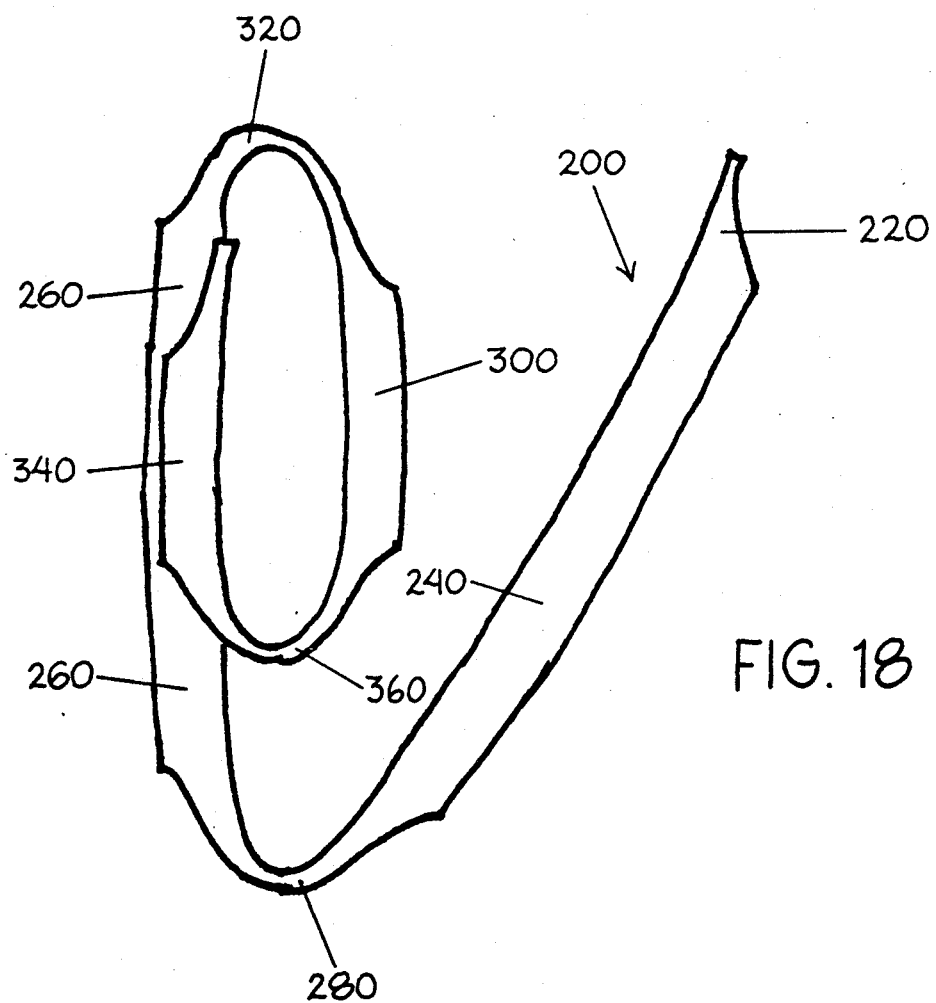
FIG. 18 is a view similar to FIG. 1 but showing a second preferred embodiment of a fishing rod clamping device according to the invention.

FIG. 18 shows a second preferred embodiment of fishing rod clamping device 200 according to the invention. Clamping device 200 is of one-piece construction and may be of the same material as clamping device 20. Device 200 includes a first cylindrical portion 240 (like first cylindrical portion 24), a second cylindrical portion 260 (like second cylindrical portion 26), a third cylindrical portion 300 (like third cylindrical portion 30), a fourth cylindrical portion 340 (like cylindrical portion 34), end bevels 220 and 380 (like end bevels 22 and 38, respectively) and webs 280, 320 and 360 (like webs 28, 32 and 36, respectively). The only difference between device 20 and device 200 is that in the latter, fourth cylindrical portion 340 has received second cylindrical portion 260 therein and is permanently secured thereto as by a suitable cement. This makes device 200 easier to handle than device 20. It is noted that with the FIG. 18 approach, portion 340 need not be cylindrical.

It is apparent that the invention well attains the stated objects and advantages among others.

The disclosed details are exemplary only and are not to be taken as limitations on the invention except as those details may be included in the appended claims.

What is claimed is:

1. A fishing rod clamping device for holding a two-section fishing rod with the sections disassembled but ready for reassembly with each other, said device comprising a one-piece modified tube of resilient material having first, second, third and fourth portions joined by first, second and third webs and said tube having opposite ends, said first, second and third portions being cylindrical, and said tube further having a slit running lengthwise of said first, second and third portions and interrupted by said webs, said slit enabling releasable engagement of one of said cylindrical portions or with a said rod section.

2. A clamping device according to claim 1 wherein said fourth portion is an additional cylindrical portion that is engageable with said second cylindrical portion.

3. A clamping device according to claim 1 wherein said fourth portion is an additional cylindrical portion that engages and is cemented to said second cylindrical portion.

4. A clamping device according to claim 1 wherein said fourth portion engages and is cemented to said second cylindrical portion.

5. A clamping device according to claim 1 wherein said opposite ends are provided by first and second end bevels.

6. A fishing rod clamping device for holding a two-section fishing rod with the sections disassembled but ready for reassembly with each other, said device comprising a one-piece modified tube of resilient material having first, second, third and fourth cylindrical portions joined by first, second and third webs and having opposite ends provided by first and second end bevels, and a slit running lengthwise of said cylindrical portions, said slit being interrupted by said webs, said slit enabling releasable engagement of one of said cylindrical portions with another one of said cylindrical portions or with a said rod section.

7. A clamping device according to claim 6 wherein said first cylindrical portion extends from said first end bevel to said first web, said second cylindrical portion extends from said first web to said second web, said third cylindrical portion extends from said second web to said third web and said fourth cylindrical portion extends from said third web to said second end bevel.

8. A clamping device according to claim 7 wherein said first cylindrical portion is longer than said second cylindrical portion, said second cylindrical portion is longer than said third cylindrical portion and said third cylindrical portion is longer than said fourth cylindrical portion.

9. A clamping device according to claim 8 wherein the length of said first cylindrical portion is about 3.75 inches (9.53 cm), the length of said second cylindrical portion is about 3 inches (7.6 cm), the length of said third cylindrical portion is about 1.75 inches (4.45 cm) and the length of said fourth cylindrical portion is about 0.75 inch (1.9 cm).

10. A clamping device according to claim 8 wherein the outside diameter of said cylindrical portions is about 0.325 inch (0.83 cm) and the inside diameter of said cylindrical portions is about 0.225 inch (0.57 cm).

11. A clamping device according to claim 8 wherein the length of said modified tube is about 15.25 inches (38.1 cm).

* * * * *